July 5, 1955  D. S. COCHRAN  2,712,207
TIRE DRESSING FIXTURE
Filed June 15, 1954
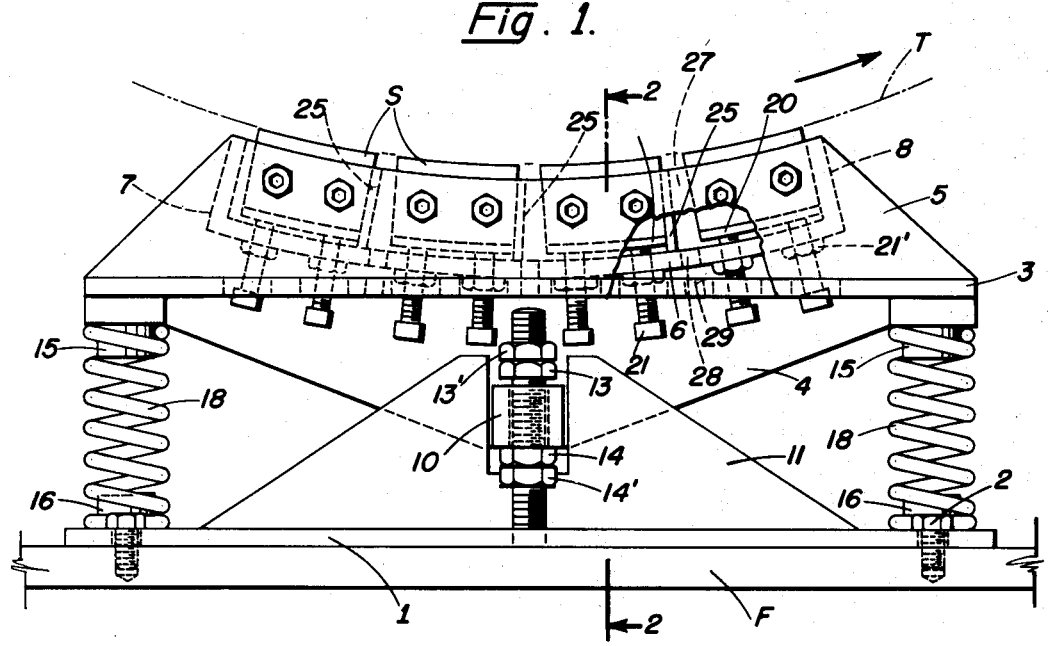
Fig. 1.
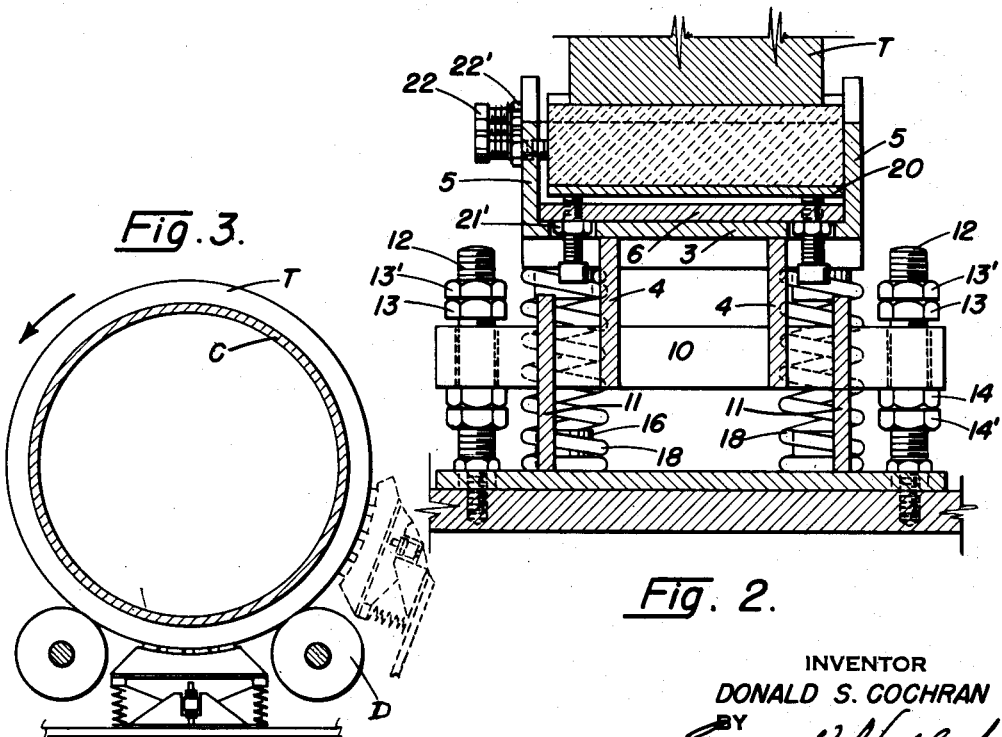
Fig. 3.
Fig. 2.
INVENTOR
DONALD S. COCHRAN
BY
ATTORNEY

United States Patent Office
2,712,207
Patented July 5, 1955

2,712,207

TIRE DRESSING FIXTURE

Donald S. Cochran, Pottstown, Pa., assignor to Stanley G. Flagg & Co., Inc., Philadelphia, Pa., a corporation of Pennsylvania Application June 15, 1954, Serial No. 436,833

8 Claims. (Cl. 51—204)

This invention is directed to the provision of means for dressing metal tires of rotative equipment supported on trunnion wheels on which the tires rest. Many types of equipment of this general character are employed in industry; for example—rotating barrel type driers, cement kilns, calcining mills, ball mills and those used for cleaning small castings by tumbling action, each comprising a long cylinder surrounded by a plurality of longitudinally spaced metal tires seating on trunnion wheels and rotated thereon by any appropriate means, the castings or other articles or material being introduced at one end of the cylinder and progressively working toward the other end from which they ultimately emerge. Such machines are large and heavy and after a period of use the tires wear unevenly with resulting production of high and low spots in their peripheral surfaces while they sometimes also wear laterally so that the tire face becomes slightly angular with respect to its axis of rotation instead of parallel thereto, these conditions producing excessive vibration in the machine as a whole which is not only inimical to the life of the machine itself but detrimental to the building in which it is housed and to other machines and apparatus located therein.

Various expedients have been proposed for remedying this condition without the necessity of shutting down the machine to permit the truing up of the tires but none, so far as I am aware, has been wholly satisfactory. Hence, as far as I have been able to determine, the only method of obtaining true tire surfaces is to take the equipment out of operation and either replace the worn tire completely or remove it from the equipment for machine truing where accurate center may be obtained, either course involving a considerable expense and loss of time.

It is therefore a principal object of my invention to provide means in the nature of a fixture by the use of which irregularities in the peripheral surface of the metal tires in rotative equipment of the general character to which I have referred may be removed without interfering with and during the normal operation of the equipment, said means being effective not only to eliminate high spots located at intervals circumferentially of the tire but also adapted to correct any lateral or transverse wear resulting in angular disposition of the face of the tire with respect to its axis of rotation.

A further object is to provide a fixture of the general character aforesaid adapted for use in successively dressing a series of tires comprised in a single machine or in a plurality of them, the fixture being designed for dressing one tire at a time preparatory to dressing the next and so on until the entire series has been brought to satisfactory operating condition.

A still further object is the provision of such fixture which is of simple yet rugged construction; which is easily positioned and adjusted for dressing a given tire; which in no way interferes with the normal operation of the equipment but functions simultaneously therewith, and which consumes no large amount of power in accomplishing its intended purpose.

Other objects and novel features of design, construction and arrangement comprehended by my invention are hereinafter pointed out or will be apparent to those skilled in the art from the following description of a preferred embodiment of it illustrated in the accompanying drawing, in which:

Fig. 1 is a side elevation of the fixture, with certain portions broken away for clearness of illustration, secured to the floor or other appropriate support in the position it occupies when dressing a tire a part of the periphery of which is indicated in broken lines;

Fig. 2 is a transverse section of the fixture shown in Fig. 1 on line 2—2 therein and looking in the direction of the arrows, a portion of a tire with which it is operatively associated also being shown in fragmentary section on substantially the same plane, and Fig. 3 is a substantially diagrammatic transverse section through the barrel and associated parts of a piece of rotative equipment of the character of that with which the fixture is designed for use and showing the fixture in operative position proximate one of the tires of the equipment.

Referring now more particularly to Figs. 1 and 2 the fixture as shown therein comprises a generally rectangular flat base 1 drilled near its ends for the passage of hold down bolts 2 by which it may be firmly secured to a floor F or other appropriate support. Above the base in generally parallel relation therewith is disposed a plate 3 from which depend laterally spaced webs 4 while in the upward direction sides 5, 5 project from its lateral edges; these may be either integral with the plate or suitably welded thereto and have their upper edges curved substantially in conformity with the curvature of the tire T of the rotative equipment. Between the sides and resting at its lowest point on plate 3 is an arcuate bottom plate 6 likewise similarly curved, the longitudinal edges of this plate being welded to the inner faces of sides 5 while end plates 7 and 8 respectively at its extremities are welded to or formed integral with it and are also welded to the sides thus forming in effect a closed-end trough having its bottom and upper lateral edges conforming to the curvature of the tire and opening upwardly.

The plate 3 and superjacent structure just described receive vertical support from webs 4, 4 the lower ends of which converge downwardly and inwardly and are notched for reception of a transversely extending squared shaft 10 to which the webs are welded, this shaft projecting oppositely outward through appropriate notches in a pair of laterally spaced guide webs 11, 11 the notches being slightly wider than the shaft through which, near its extremities, extend leveling studs 12, 12. The lower ends of these studs which are threaded throughout their length are received in holes in base 1 and are welded thereto while above and below the shaft which is appropriately bored for their passage with suitable clearance the studs carry adjusting nuts 13, 14 and locking nuts 13', 14' respectively associated therewith. Thus by backing off nuts 13, 13' and setting up on nuts 14 the shaft and structure supported thereby may be raised from the position shown in Fig. 1 or lowered below it, the notches in guide webs 11 being sufficiently deeper than the vertical dimension of the shaft to allow a considerable range of adjustment of the latter.

Near its extremities, and at other appropriate places if required or deemed desirable, plate 3 is provided with downwardly depending laterally spaced bosses 15 and the base with like bosses 16 aligned therewith, the several bosses entering the ends of relatively heavy coil springs 18 interposed between the base and the superjacent plate 3 for yieldingly supporting and upwardly urging the latter to the extent permitted by the adjusted position of nuts 13 which limit upward movement of shaft 10 and its associated parts.

Within the trough-like structure formed by the sides 5, bottom plate 6 and end plates 7 and 8, which structure I term the stone holder, are seated a plurality of grinding stones S made of Carborundum or other appropriate abrasive material. These stones are preferably rectangular in cross section, slightly shorter than the distance between the sides 5, 5 and somewhat longer than the width of the tire to be dressed. Preferably, as shown, four stones are provided but a greater number and in some cases a fewer may be employed if desired as long as their combined length measured between end plates 7 and 8 is sufficient to fulfill the condition hereinafter mentioned and which is of paramount importance in the successful operation of the fixture. Each of these stones seats on a follower 20 which extends transversely of the stone holder and rests either on the inner face of bottom plate 6 or under normal conditions on the ends of adjusting screws 21 four of which are provided for each follower and disposed near its respective corners; these screws are threaded through bottom plate 6 and carry lock nuts 21' for the passage of which plate 3 is suitably drilled out so that the lock nuts when set up will engage the lower face of the bottom plate. Thus by adjustment of its associated screws 21 the position of each follower can be determined with respect to the bottom plate and also the tire to be dressed. One of the sides 5 of the stone holder is also drilled and threaded in alignment with each stone for reception of a pair of locking screws 22, these screws carrying lock nuts 22' adjacent the outer face of the side to hold them in place after adjustment.

When the fixture is in operative position the stones S engage the periphery of the tire which constantly rotates in a given direction, for example, counterclockwise as shown by the arrows in Figs. 1 and 3 thus imparting a considerable thrust on the stones in a corresponding direction. To resist this thrust transverse spacers 25 are extended across the stone holder and welded to its sides and bottom, one spacer being supplied for each stone except the last one considered in the direction of tire rotation since this stone abuts directly against end plate 8. The spacers are so disposed and the proportions of the several parts so determined that there is a distinct clearance between the stones themselves and between the outer face of each spacer and the proximate face of the next adjacent stone, again considered in the direction of tire rotation. These clearances form passages 27 through which all metal particles removed from the tire by the operation of the stones can fall between the latter and thence to the base of the fixture through holes 28, 29 respectively drilled in bottom plate 6 and in plate 3 in general alignment with passages 27.

Fig. 3 is designed to illustrate in a general way the use of the fixture in dressing one of the series of tires T surrounding and supporting at spaced intervals an elongated casing C while resting and being rotated on trunnions D. The fixture is preferably disposed, as shown in full lines, between the trunnions on which rests the tire to be dressed although it may be appropriately supported slightly above either trunnion, as fragmentarily indicated in dotted lines, if more convenient because of lack of clear space or other reason and, in any case, with its stones S in contact with the periphery of the tire to which position it is brought in the manner now to be described: Before placing the fixture in position nuts 14 are backed off a suitable distance and nuts 13 screwed down so as to depress the squared shaft 10 and correspondingly draw the stones and associated parts downward against the compression of springs 18. The fixture is then placed adjacent the tire to be dressed and aligned with the latter transversely so that the stones, which as mentioned are preferably somewhat longer than the tire width, will extend beyond the tire in both directions with studs 12 substantially in the vertical plane containing the tire axis; in this position the fixture is clamped to the floor or other support by bolts 2 so as to secure it firmly in place. Nuts 13 are then backed off for a distance more than sufficient to permit springs 18 to bring the stones into contact with the tire and, if desired, nuts 14 moved up to engage shaft 10 in its raised position. The stones are next individually adjusted to engage the high spots on the tire by means of screws 21 which, after this adjustment is completed, are locked in place by their lock nuts. The transverse locking screws 22 are next firmly set up and locked so as to hold the individual stones in the stone holder which, of course, is yieldingly and constantly urged toward the tire by springs 18. The rotating equipment is then put into operation and continued therein until all high spots or other irregularities in the peripheral surface of the tire are removed and the latter thus placed in perfect condition. Rotation of the equipment is then stopped and the stones withdrawn from the tire by backing off nuts 14 and setting up nuts 13 to enable removal of the fixture after the hold down bolts are taken out preparatory to using it to dress another worn tire.

In the foregoing description it has been assumed that the irregularities in the tire surface are in general in the nature of circumferentially spaced-apart depressions with high spots between them and that the face of the tire is substantially parallel with the axis of tire rotation. However, if the said face by reason of wear or other condition occupies a slightly angular as distinguished from such parallel relation the stones through the medium of screws 21 may be adjusted preparatory to the start of the dressing operation to substantially corresponding but opposite angularity so that during the dressing they will exert greater pressure on the high than on the low side of the tire and so ultimately return its face to parallelism with said axis while at the same time removing the high spots.

The success of my invention in the performance of its intended function is primarily dependent on the fact that the combined length of the stones measured in the plane of rotation of the tire exceeds the length of any of the low spots in the latter measured circumferentially of it, with the result that the stones bear only on the high points and bridge the depressions at all times during the dressing; hence as the tire rotates against the stones the high points are gradually reduced without accentuating the depressions until its entire periphery is brought to a true circle and thus in condition to run smoothly and without vibration on the trunnions on which the tire is rotated, as has been demonstrated conclusively under practical operating conditions. In fact, in one installation in which large rotative equipment is employed for cleaning castings the vibration set up thereby after a period of use was so great that in an adjacent building disconnected from that in which the equipment is housed it was substantially impossible to make engineering drawings, but after use of my fixture on the equipment tires vibration was substantially eliminated, a result theretofore unattainable by many other means and expedients which were tried in efforts to solve the problem.

While I have herein described and illustrated a preferred embodiment of my invention with considerable particularity I do not thereby desire or intend to confine or restrict myself specifically thereto as if desired various changes and modifications may be made in the design, construction and method of assembly of the various parts without departing from the spirit and scope of the invention as defined in the appended claims.

Having thus described my invention, I claim and desire to protect by Letters Patent of the United States:

1. A metal tire dressing fixture comprising a base adapted for securement to a support, stone holding means disposed above the base including a trough-like structure having sides and ends and a bottom curved in substantial conformity with the tire to be dressed, a series of stones seated in said holding means in spaced relation lengthwise thereof, means operative to adjustably vary the position of the stones individually with respect to said bottom, spacers extending transversely within said structure adapted to restrain the stones from movement toward one end thereof, means for locking the stones in place after their said individual adjustment, a plate supporting said trough-like structure and having downwardly depending webs, a transversely extending shaft receiving said webs, giude means for the shaft fixed to the base, means operable to limit the extent of movement of the shaft in the guide means, and means yieldingly supporting said plate from the base and biasing it upwardly therefrom.

2. A metal tire dressing fixture as defined in claim 1 in which the adjusting means for each stone comprises a follower forming a seat for the stone and adjusting screws threaded through the bottom of the trough-like structure for engagement with the follower.

3. A metal tire dressing fixture as defined in claim 1 in which the shaft is square in cross section and the means for limiting its movement in the guide means comprise threaded studs extending from the base through the shaft and nuts carried thereby above and below the shaft.

4. A metal tire dressing fixture as defined in claim 1 in which the locking means for the individual stones comprise screws threadetd through a side of the trough-like structure adapted to bear on the end of the adjacent stone to lock it between said screws and the opposite side of the structure, and the upper edges of said sides are curved in general conformity with said bottom.

5. A metal tire dressing fixture as defined in claim 1 in which the means yieldingly biasing the plate away from the base comprise coil springs extending between the base and plate respectively proximate the corners thereof.

6. A metal tire dressing fixture as defined in claim 1 in which the bottom of the trough-like structure is apertured below the spaces between the stones and the plate supporting said structure is likewise apertured in substantial alignment with the apertures in said bottom.

7. A metal tire dressing fixture comprising a base adapted for securement to a support, stone holding means disposed above the base including a trough-like structure having its bottom curved in substantial conformity with the curvature of the tire to be dressed, a series of stones seated in said holding means in spaced relation lengthwise thereof, a series of fixed spacers extending between the sides of said structure adapted to hold the separate stones from movement toward one end thereof, means for adjusting the position of each stone relative to said bottom, means yieldingly supporting the stone holding means upon the base and biasing said holding means toward the tire axis, and means for limiting movement of said holding means toward said axis.

8. A metal tire dressing fixture comprising a base adapted for securement to a support, stone holding means disposed above the base including a trough-like structure having its bottom curved in substantial conformity with the curvature of the tire to be dressed, a series of stones seated in said holding means in spaced relation lengthwise thereof, means for adjusting the position of each stone relative to said bottom, means for separately locking the stones against movement relative to the trough-like structure after their individual adjustment relative to the bottom thereof, means yieldingly supporting the stone holding means upon the base and biasing said holding means toward the tire axis and means for limiting movement of the stone holding means toward said axis.

References Cited in the file of this patent
UNITED STATES PATENTS

| | | |
|---|---|---|
| 750,479 | McCormic | Jan. 26, 1904 |
| 841,541 | Kramer | Jan. 15, 1907 |
| 944,147 | Nichols | Dec. 21, 1909 |
| 2,172,720 | Wendt | Sept. 12, 1939 |
| 2,502,381 | Indge | Mar. 28, 1950 |
| 2,664,679 | Kelly | Jan. 5, 1954 |